United States Patent
Jung et al.

(10) Patent No.: US 8,699,859 B2
(45) Date of Patent: Apr. 15, 2014

(54) INFORMATION STORAGE MEDIUM INCLUDING APPLICATION FOR PROVIDING METADATA, AND APPARATUS FOR AND METHOD OF PROVIDING METADATA

(75) Inventors: Kil-soo Jung, Hwaseong-si (KR); Hyo-jin Sung, Seoul (KR); Bong-gil Bak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1704 days.

(21) Appl. No.: 11/440,998

(22) Filed: May 26, 2006

(65) Prior Publication Data

US 2006/0280048 A1    Dec. 14, 2006

Related U.S. Application Data

(60) Provisional application No. 60/684,559, filed on May 26, 2005.

(30) Foreign Application Priority Data

Aug. 24, 2005  (KR) .................. 10-2005-0078015

(51) Int. Cl.
 *H04N 5/782*  (2006.01)
 *H04N 5/85*   (2006.01)

(52) U.S. Cl.
 USPC .......................................... 386/291; 386/294

(58) Field of Classification Search
 USPC ........................................................... 386/46
 See application file for complete search history.

(56) References Cited

U.S. PATENT DOCUMENTS

| | | | |
|---|---|---|---|
| 5,570,242 A | 10/1996 | Leonhardt et al. | |
| 5,610,841 A * | 3/1997 | Tanaka et al. | 725/115 |
| 5,633,843 A | 5/1997 | Gupta et al. | |
| 6,202,099 B1 | 3/2001 | Gillies et al. | |
| 6,346,951 B1 * | 2/2002 | Mastronardi | 715/716 |
| 6,505,252 B1 * | 1/2003 | Nagasaka | 709/232 |
| 2002/0110353 A1 * | 8/2002 | Potrebic et al. | 386/46 |
| 2002/0178173 A1 | 11/2002 | Chefalas et al. | |
| 2002/0198864 A1 | 12/2002 | Ostermann et al. | |
| 2004/0019602 A1 | 1/2004 | Williams et al. | |
| 2006/0161928 A1 * | 7/2006 | Douglass et al. | 720/600 |
| 2006/0242009 A1 * | 10/2006 | Crolley | 705/14 |
| 2006/0277382 A1 * | 12/2006 | Matsui et al. | 711/165 |

FOREIGN PATENT DOCUMENTS

| | | |
|---|---|---|
| EP | 1 349 164 A1 | 1/2003 |
| JP | 05-250237 | 9/1993 |
| JP | 2002-108892 | 4/2002 |

(Continued)

OTHER PUBLICATIONS

Taiwanese Office Action issued on Nov. 9, 2009, in Taiwanese Patent Application No. 095118649 (7 pages, in Chinese, complete English Translation).

(Continued)

*Primary Examiner* — William C Vaughn, Jr.
*Assistant Examiner* — Asher Khan
(74) *Attorney, Agent, or Firm* — NSIP Law

(57) ABSTRACT

An information storage medium includes application information for performing reproduction with reference to metadata stored in a reproduction apparatus; and additional information for providing the metadata as a user interface provided by a content producer.

15 Claims, 5 Drawing Sheets

(56) References Cited

FOREIGN PATENT DOCUMENTS

| | | |
|---|---|---|
| JP | 2003-122761 | 4/2003 |
| KR | 10-0233175 B1 | 12/1999 |
| KR | 2002-39663 | 5/2002 |
| KR | 2003-67248 | 8/2003 |
| KR | 2004-15612 | 2/2004 |
| TW | 200420046 | 10/2004 |
| TW | I223239 | 11/2004 |
| WO | WO 2004/084214 A1 | 9/2004 |

OTHER PUBLICATIONS

Search Report and written opinion issued in PCT Application KR 2006-1970 on Jun. 29, 2006.

Korean Office Action issued Jul. 30, 2012 in counterpart Korean Patent Application No. 10-2005-0078015 (5 pages, in Korean).

Korean Non-Final Rejection issued Oct. 31, 2011, in counterpart Korean Application No. 10-2005-0078015 (8pp, including English translation).

* cited by examiner

| SPRM | MEANING |
|---|---|
| 0 | Current Menu Description Language Code |
| 1 | Audio Stream number |
| 2 | Sub-picture stream number and On/Off flag |
| 3 | Angle number |
| 4 | Title number |
| 5 | VTS Title number |
| 6 | Title PGC number |
| 7 | Part of Title number |
| 8 | Highlighted Button number |
| 9 | Navigation Timer |
| ... | ... |
| n | Player Capability for Disc Library |
| ... | ... |
| 31 | reserved |
|  |  |

INFORMATION STORAGE MEDIUM INCLUDING APPLICATION FOR PROVIDING METADATA, AND APPARATUS FOR AND METHOD OF PROVIDING METADATA

CROSS-REFERENCE TO RELATED PATENT APPLICATIONS

This application claims the benefit of Korean Patent Application No. 2005-78015 filed on Aug. 24, 2005, in the Korean Intellectual Property Office, and U.S. Provisional Application No. 60/684,559 filed on May 26, 2005, in the United States Patent and Trademark Office, the disclosures of which are incorporated herein by reference in their entirety.

BACKGROUND OF THE INVENTION

1. Field of the Invention

An aspect of the invention relates to an information storage medium including an application for providing metadata, and an apparatus for and method of providing metadata, and more particularly to an information storage medium including an application for providing to users disc library metadata stored in a reproduction apparatus, and an apparatus for and method of providing metadata.

2. Description of the Related Art

Information storage media such as DVDs can store audiovisual (AV) data (or moving picture data streams) including video, audio, and subtitles, compressed and encoded according to the MPEG (Moving Picture Experts Group) standard, etc. Also, the information storage media can store additional information, such as the encoding attributes or reproducing order of moving picture data streams.

Reproduction apparatuses for reproducing such information storage media cannot store physical information and moving picture-related information (for example, the type of the information storage media, a title name, an actor, an actress, a movie genre, a director, etc.) of the information storage media which have been reproduced by the reproduction apparatuses so that the physical information and the moving picture-related information can be searched and reused after the information storage media have been removed from the reproduction apparatuses. Furthermore, conventional information storage media cannot provide an additional function for reproducing additional information stored in a reproduction apparatus according to a format required by a content producer.

SUMMARY OF THE INVENTION

An aspect of the invention provides an information storage medium including an application for providing metadata which is acquired from an information storage medium reproduced by a reproduction apparatus and is stored in the reproduction apparatus, according to a user interface provided by a content producer or a content producer's format.

Another aspect of the invention provides an apparatus for and method of providing metadata using an application read from an information storage medium in which the metadata is stored.

According to an aspect of the invention, an information storage medium includes application information for performing reproduction with reference to metadata stored in a reproduction apparatus; and additional information for providing the metadata as a user interface provided by a content producer.

According to an aspect of the invention, the metadata is stored in the reproduction apparatus according to a type of the information storage medium before the reproduction apparatus reproduces the information storage medium, so that the metadata is searchable even after the information storage medium has been removed from the reproduction apparatus.

According to an aspect of the invention, the application information includes program data for determining whether the reproduction apparatus supports metadata.

According to an aspect of the invention, the program data includes an API function for inquiring as to whether metadata stored in the reproduction apparatus is provided and checking information received from the reproduction apparatus. The information received from the reproduction apparatus is a system parameter set in a system register of the reproduction apparatus. The program data includes an access API function for extracting metadata stored in the reproduction apparatus to provide the metadata as a user interface.

According to another aspect of the invention, a reproduction apparatus includes a local storage that stores disc library metadata read from an information storage medium; a navigation manager that reads an application for creating a user interface for providing the metadata stored in the local storage from the information storage medium, and executing the application; and a renderer that outputs the user interface.

According to another aspect of the invention, a method of providing metadata includes reading an application for providing a disc library from an information storage medium; determining through the application whether the reproduction apparatus supports the disc library; extracting metadata from a local storage of a reproduction apparatus for reproducing the information storage medium; creating the extracted metadata as a user interface using additional information stored in the information storage medium; and providing the user interface to a user.

According to another aspect of the invention, there is provided a computer-readable medium encoded with processing instructions for implementing a method, performed by a computer, of providing metadata, the method including reading an application for providing a disc library from an information storage medium; determining through the application whether the reproduction apparatus supports the disc library; extracting metadata from a local storage of a reproduction apparatus for reproducing the information storage medium; creating the extracted metadata as a user interface using additional information stored in the information storage medium; and providing the user interface to a user.

According to another aspect of the invention, a reproduction apparatus includes a local storage that stores disc library metadata read from an information storage medium by the reproduction apparatus and retains the disc library metadata even after the information storage medium has been removed from the reproduction apparatus so that the disc library metadata is searchable even after the information storage medium has been removed from the reproduction apparatus; and a disc library manager that reads the disc library metadata from the local storage in response to a user input requiring a disc library and creates a user interface for the disc library using a resident application of the reproduction apparatus.

Additional aspects and/or features of the invention will be set forth in part in the description which follows and, in part, will be obvious from the description, or may be learned by practice of the invention.

BRIEF DESCRIPTION OF THE DRAWINGS

These and/or other aspects and features of the invention will become apparent and more readily appreciated from the following description of embodiments of the invention, taken in conjunction with the accompanying drawings of which.

DETAILED DESCRIPTION OF THE INVENTION

Figure 1:
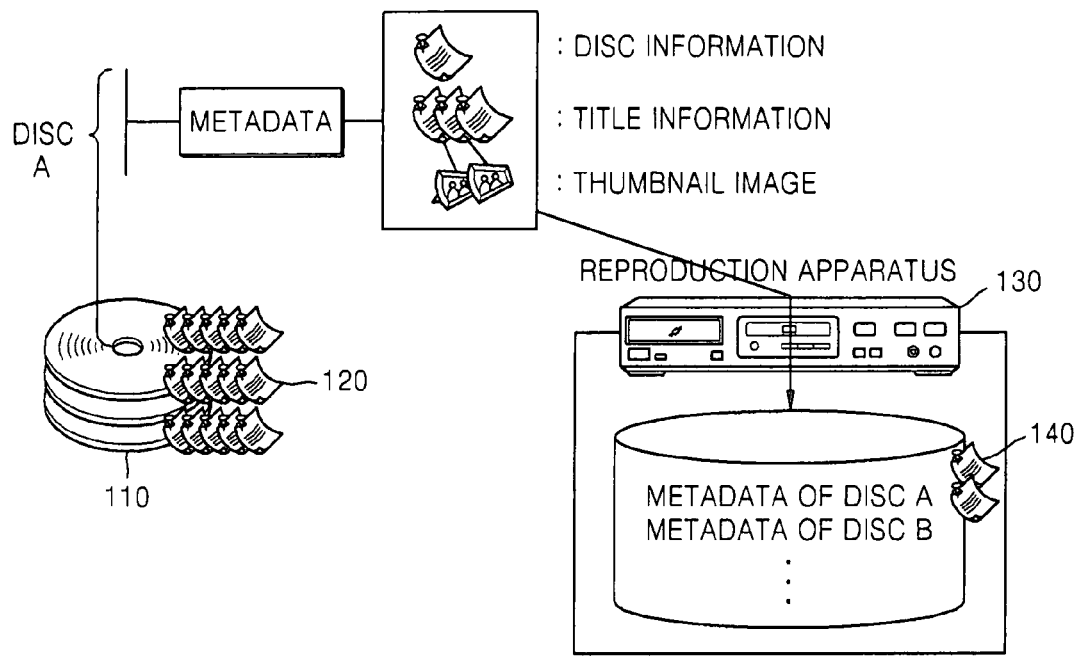
FIG. 1 is a schematic view of a system according to an embodiment of the invention for storing disc library metadata received from an information storage medium in a disc library stored in a reproduction apparatus.

Reference will now be made in detail to embodiments of the invention, examples of which are shown in the accompanying drawings, wherein like reference numerals refer to like elements throughout. The embodiments are described below to explain the invention by referring to the figures.

In this application, a disc library is data (or a file) including, for example, medium-related information, issue information, available region information, supportable audio/caption information, and information regarding a reproducible unit (for example, a title) of an information storage medium (for example, an optical disc). Hereinafter, an example related to the reproducible unit will be described.

In this application, a disc library application is an application which is stored in an information storage medium and provides disc library metadata stored in a reproduction apparatus as an application resource.

FIG. 1 is a schematic view of a system according to an embodiment of the invention for storing disc library metadata received from an information storage medium in a disc library stored in a reproduction apparatus.

Referring to FIG. 1, disc library metadata 120 of a disc 110 (that is, an information storage medium) includes disc information, title information, and thumbnail information linked to the title information. The disc information is, for example, disc-related information, such as the format of the disc, the name of the disc 110, the number of titles included in the disc 110, issue information of the disc 110, the available region information of the disc 110, etc. The title information may include information such as the title name, an actor, an actress, a genre, a director, and parental guide (PG) information. The thumbnail information is thumbnail images which are images related to the title information.

When the disc 110 including the disc library metadata 120 is inserted into a reproduction apparatus 130, the reproduction apparatus 130 determines whether there is sufficient space in a local storage of the reproduction apparatus 130 to store the disc library metadata 120, and reserves a storage area, which may be identified by a unique identifier of the disc 110, in the local storage for storing the disc library metadata 120. The disc library metadata 120 is stored in a storage area of a local storage, which may be identified by a unique identifier of the reproduction apparatus 130. A disc library 140 is formed by the disc library metadata 120 included in one or more discs 110 that has been stored in the local storage.

Accordingly, even if the disc 110 is removed from the reproduction apparatus 130, it is possible to search for the disc 110 or a specific title on the disc 110 using the disc library metadata 120 of the disc 110 in the disc library 140 which was stored in the local storage when the disc 110 was reproduced by the reproduction apparatus 130. At this time, an application for providing the disc library 140 to a user interface is a resident application in the reproduction apparatus 130.

If the disc 110 includes application information for providing disc library metadata and style information for creating a user interface format for providing disc library metadata as additional information, the disc library 140 can be provided to a user in various formats according to the application information and the style information stored in the disc 110. This will be described with reference to FIGS. 3 through 7 below.

Figure 2:
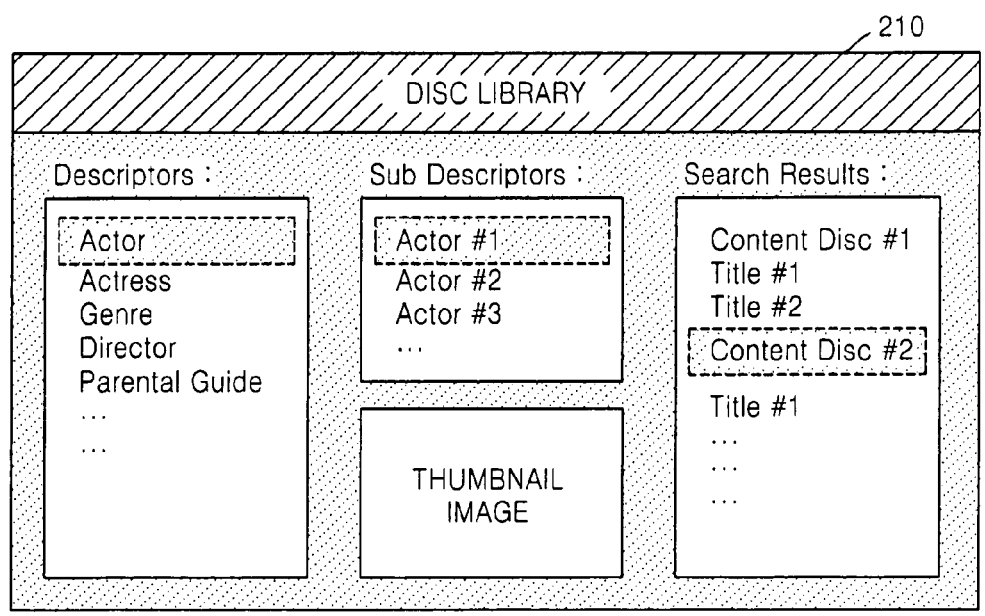
FIG. 2 shows a screen on which a reproduction apparatus of FIG. 1 provides a disc library using a resident application.

FIG. 2 shows a screen 210 on which the reproduction apparatus 130 of FIG. 1 provides the disc library 140 using a resident application.

The resident application of the reproduction apparatus 130 can provide disc library metadata 120 stored from various types of discs 110 as a user interface shown in FIG. 2. In this case, a disc library 140 having a uniform format can be provided as shown in FIG. 2, even though the disc library metadata 120 of different discs 110 may be stored in different formats according to the types of the different discs 110. Also, when a disc 110 that has been previously reproduced is reproduced again, the disc library 140 can be provided as a user interface having a different format than when the disc 110 was previously reproduced when the content of the resident application is different according to the type of the reproduction apparatus 130 that is currently reproducing the disc 110. Accordingly, it is impossible to provide the disc library 140 in a format required by a studio which stored the disc library metadata 120 in the disc 110.

Referring to FIG. 2, the disc library 140 provided by the reproduction apparatus 130 includes descriptors, sub descriptors, search results, and thumbnail images linked to the search results. In FIG. 2, the descriptors include "Actor", "Actress", "Genre", "Director", "Parental Guide" (PG) information, etc. If a user selects "Actor" from the descriptors, the reproduction apparatus 130 provides a list of actors' names as the sub descriptors. If the user selects "Actor #1" from the sub descriptors, the reproduction apparatus 130 provides, as search results, disc information of any discs storing movies in which "Actor #1" has appeared, and thumbnail images linked to the disc information.

Figure 3:
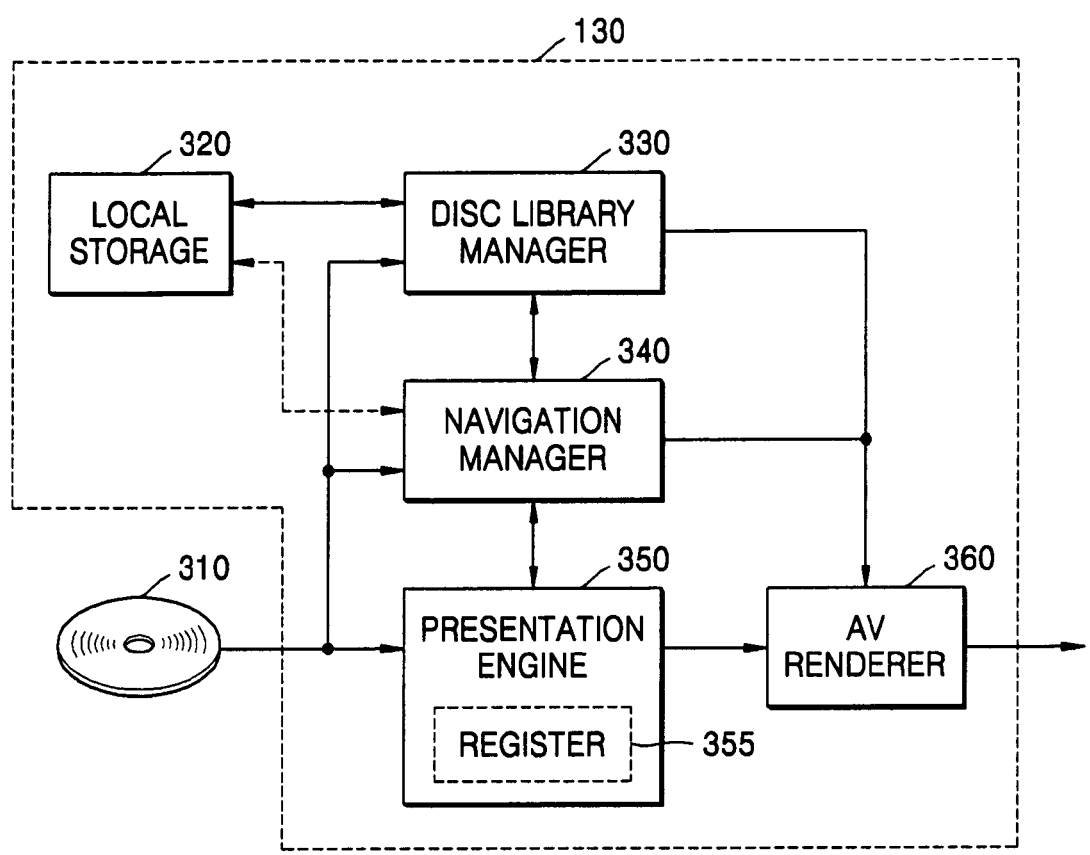
FIG. 3 is a block diagram of a reproduction apparatus providing the disc library of FIG. 1 according to an embodiment of the invention.

FIG. 3 is a block diagram of the reproduction apparatus 130 providing the disc library 140 of FIG. 1 according to an embodiment of the invention.

Referring to FIG. 3, the reproduction apparatus 130 includes a local storage 320, a disc library manager 330, a navigation manager 340, a presentation engine 350, and an AV renderer 360.

The local storage 320 stores disc library metadata received from an information storage medium 310.

The disc library manager 330 reads disc library metadata from the information storage medium 310, stores the disc library metadata in the local storage 320, and reads disc library metadata from the local storage 320 in response to a user's input processed by the navigation manager 340. The disc library manager 330 then creates a user interface using a resident application for providing a disc library, and transfers the user interface to the AV renderer 360. The AV renderer 360, which mixes and outputs decoded and processed AV data, outputs the user interface created by the disc library manager 330.

The presentation engine 350 decodes moving picture data and includes a system register 355 of the reproduction apparatus 130. A system register 355 according to an embodiment of the invention includes a system parameter containing information indicating whether or not the reproduction apparatus 130 supports disk library metadata which can be used by an application in the information storage medium 310, as will be described later. Accordingly, the presentation engine 350 defines an API (application program interface) for enabling the application in the information storage medium 310 to refer to the system register 355.

The navigation manager 340 interprets and processes additional data (for example, markup document, program data, style information) other than moving picture information stored in the information storage medium 310. Accordingly, the navigation manager 340 interprets application information for reproducing disc library metadata stored in the information storage medium 310. Also, the navigation manager 340 interprets a user's input and transfers the interpreted result to different components in the reproduction apparatus 130. In FIG. 3, the disc library manager 330 is separate from the navigation manager 340, but the disc library manager 330 may be integrated with the navigation manager 340.

Also, the navigation manager 340 interprets an application stored in the information storage medium 310 for using the disc library metadata, and determines whether the reproduction apparatus 130 supports the disc library metadata. Then, if the navigation manager 340 accesses the system register 355 in the presentation engine 350 using the API to determine whether the reproduction apparatus 130 supports the disc library metadata, according to a request of the application, the presentation engine 350 can output a value indicating whether the reproduction apparatus 130 supports the disc library metadata to the navigation manager 340.

The navigation manager 340 interprets and processes the style information included in the additional information stored in the information storage medium 310, and creates a user interface using the disc library metadata and the style information.

A method in which the disc library manager 330 provides disc library metadata using a resident application is performed as follows. If a user input requiring a disc library is transferred to the disc library manager 330 through the navigation manager 340, the disc library manager 330 reads disc library metadata stored in the local storage 320, creates a user interface using a resident application, provides the user interface to the AV renderer 360, and thus provides a disc library to a user.

A method according to an embodiment of the invention in which the reproduction apparatus 130 provides a disc library using a specific disc library application stored in the information storage medium 310 is performed as follows.

First, a disc library application stored in the information storage medium 310 for using a disc library is read, and it is determined whether the reproduction apparatus 130 supports a disc library using the disc library application.

For performing the operation, the reproduction apparatus 130 includes the system register 355 storing information (for example, "Player Capability for Disc Library") indicating whether or not a disc library is provided, which is a system parameter for storing a reproduction state and a reproduction setting state. The information storage medium 310 defines an API for enabling the disc library application to determine whether or not the reproduction apparatus 130 supports a disc library by reference to the system register 355.

For example, the disc library application defines an API such as "Can_DoDiscLibrary". Accordingly, before the disc library application is executed, the API is called and then information is received from the reproduction apparatus 130. The received information can be defined in an API function so that it is set to a value corresponding to a system parameter of the above-described system register 355. If a value (for example, a value "true") indicating that the reproduction apparatus 130 supports the disc library is received from the reproduction apparatus 130, the disc library application can be executed.

As such, if it is determined that the reproduction apparatus 130 provides the disc library to the disc library application, an access API defined to allow the disc library application to read and provide disc library metadata stored in the local storage 320 of the reproduction apparatus 130 is interpreted by the navigation manager 340. The interpreted access API accesses the local storage 320 through a path denoted by the dashed line in FIG. 3 and reads disc library metadata stored in the local storage 320.

For example, the access API reads disc library metadata stored in the reproduction apparatus 130 defined as follows.

(1) get_Descriptor_List(void): extract metadata to be provided as descriptors.

(2) get_Subdescriptor_List(Descriptor desc): receive a selected descriptor of the descriptors obtained by get_Descriptor_List and extract metadata to be provided as sub descriptors for the selected descriptor.

(3) get_DiscLibrary_List(Descriptor desc, Subdescriptor subDesc): receive the selected descriptor and the selected sub descriptor and extract metadata to be provided as search results for the selected descriptor and the selected sub descriptor.

For example, if the disc library application provides descriptors and a user selects one of the descriptors (for example, "Actor"), a list of actors is provided as sub descriptors. If the user selects an actor from the list of actors, a disc library (for example, disc information, title information, etc.) of any discs including movies in which the selected actor appears can be provided.

The navigation manager 340 creates a user interface for providing disc library metadata read using style information stored in the information storage medium 310, and outputs the user interface to the AV renderer 360 which provides the user interface to the user. Accordingly, a disc library can be provided according to a disc library application provided by a studio as a metadata producer, using the user interface provided by the application stored in the information storage medium 310.

Figures 4, 5:
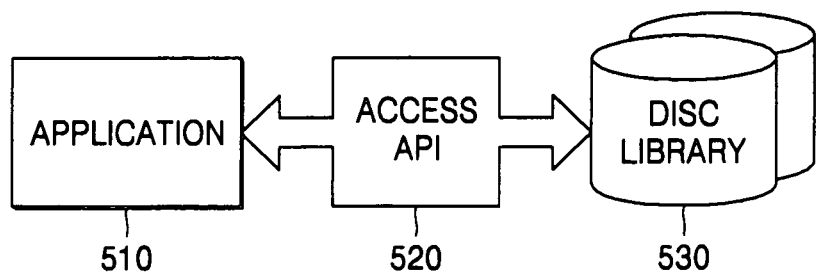
FIG. 4 is a table of system parameters set in a system register of a presentation engine of FIG. 3 according to an embodiment of the invention.
FIG. 5 is a diagram for functionally explaining a method of providing a disc library according to an embodiment of the invention.

FIG. 4 is a table of system parameters set in the system register 355 of the presentation engine 350 of FIG. 3 according to an embodiment of the invention.

Referring to FIG. 4, the system register 355 is a predetermined storage area for storing a plurality of system parameters SPRAMs including reproduction-related information set in the reproduction apparatus 130. In FIG. 4, system parameters 0 through 31 are shown. The system parameters include various control information regarding moving picture reproduction supported by the reproduction apparatus 130, such as a language code of a menu, audio stream numbers, sub picture stream numbers, on/off flags, title numbers, etc. Also, a plurality of reserved areas for later use are provided.

The system register 355 according to the invention includes a "Player Capability for Disc Library" system parameter indicating whether the reproduction apparatus 130 is capable of providing a disc library. The "Player Capability for Disc Library" system parameter is stored in an arbitrary n-th area of the system register 355. Accordingly, when the disc library application stored in the information storage medium 310 tries to use the disc library of the reproduction apparatus 130, the disc library application can determine whether the reproduction apparatus 130 supports the disc library with reference to a value set in the "Player Capability for Disc Library" system parameter.

The number of system parameters included in the system register 355 of FIG. 4, the length of each parameter, an order of the system parameters, etc., are exemplary, and the system parameters may be implemented in various formats.

FIG. 5 is a diagram for functionally explaining a method of providing a disc library application according to an embodiment of the invention.

Referring to FIG. 5, a disc library application 510 stored in an information storage medium uses an access API 520 to use a disc library 530 stored in a local storage of a reproduction apparatus as a resource of a specific application. Referring to FIGS. 3 and 5, the access API 520 is defined as an access API function in the information storage medium 310, is interpreted by the navigation manager 340, and then can access disc library metadata in the local storage 320.

Since the disc library metadata is read from the local storage 320 using the access API 520, and the read disc library metadata can be created as a user interface according to the style information stored in the information storage medium 310, it is possible to provide a user interface for the disc library on the basis of a scenario according to an intention of a producer of the information storage medium 310.

Figure 6:
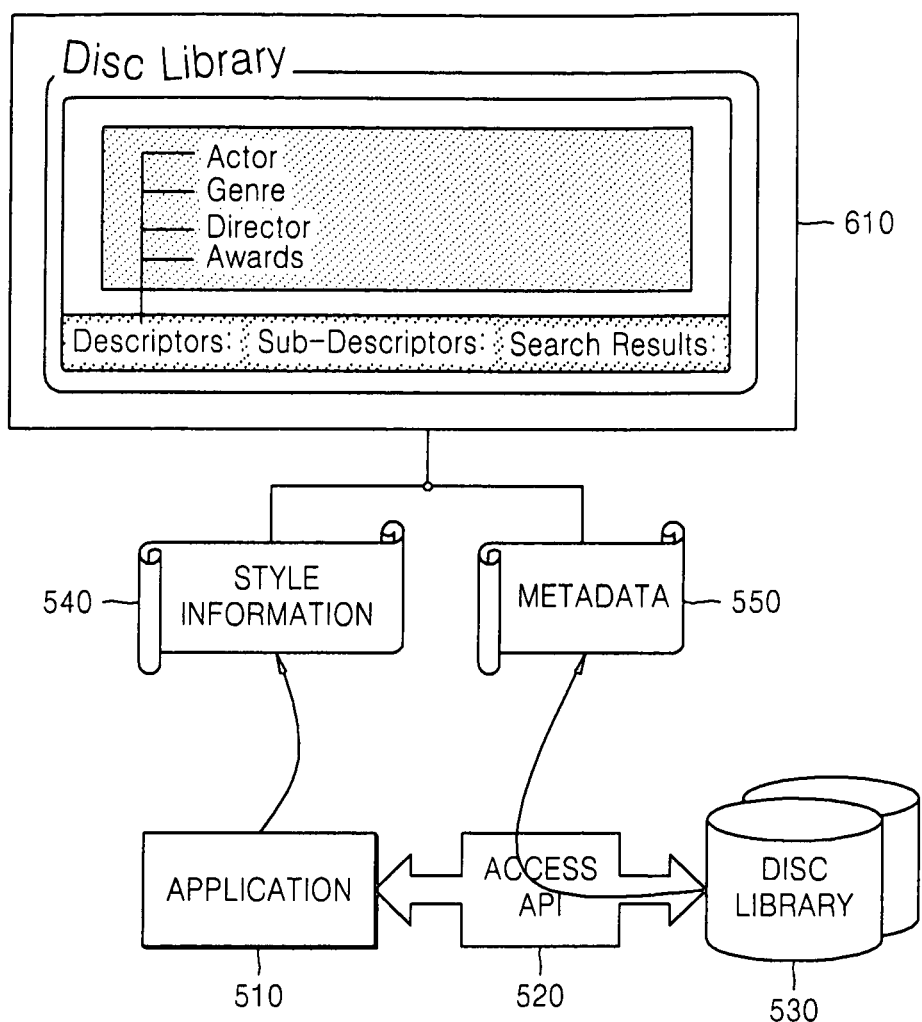
FIG. 6 is a diagram for functionally explaining a method of creating a screen for providing a disc library using style information as additional information and a disc library application of an information storage medium according to an embodiment of the invention.

FIG. 6 is a diagram for functionally explaining a method of creating a screen 610 for providing a disc library 530 using style information 540 as additional information and the disc library application 510 of the information storage medium 310 according to an embodiment of the invention.

As described above with reference to FIG. 5, the disc library application 510 of the information storage medium calls 310 an access API function 520 and reads disc library metadata 550 stored in the disc library 530 of a reproduction apparatus.

Since a user interface is provided using the read disc library metadata 550 and the style information 540 among additional information stored in the information storage medium, a disc library suitable to the intention of a studio which is a producer of the information storage medium 310 can be provided in the screen 610. In the screen 610 for providing the disc library of FIG. 6, descriptors include "Actor", "Genre", "Director", "Awards", etc. For example, if a user selects "Actor", a list of actors is provided as sub descriptors. If the user selects an actor from the list of actors, disc information, title information, or thumbnail images for the disc including movies, etc., in which the selected actor appears will be provided as search results.

Figure 7:
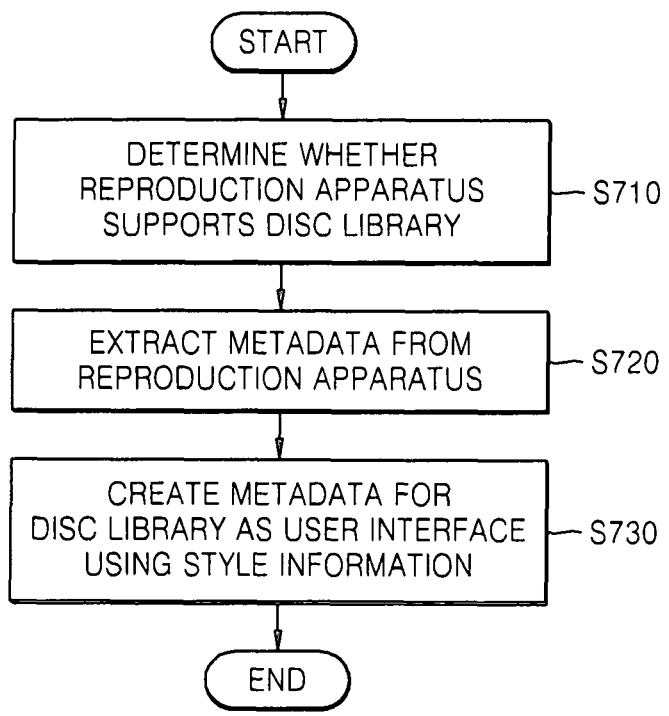
FIG. 7 is a flowchart explaining a method of providing a disc library according to an embodiment of the invention.

FIG. 7 is a flowchart showing a method of providing a disc library according to an embodiment of the invention.

If a user requires a disc library, an application for providing the disc library is read from an information storage medium and it is determined through the application whether a reproduction apparatus supports the disc library (operation S710). This operation is conducted by executing an API that queries the reproduction apparatus as to whether the reproduction apparatus is capable of providing disc library metadata and receives a value set in the system parameter "Player Capability for Disc Library" of the reproduction apparatus from the reproduction apparatus in response to the query as described above.

If the system parameter "Player Capability for Disc Library" indicates that the reproduction apparatus supports the disc library, the disc library metadata is extracted from the information storage medium (operation S720). At this time, an access API for searching the disc library is executed. The extracted disc library metadata is created as a user interface using the style information stored in the information storage medium, and the user interface is provided to a user (operation S730).

As described above, by using an application of an information storage medium when a disc library stored in a reproduction apparatus is provided as a user interface, it is possible to provide the disc library to a user in a format required by a studio producing metadata.

Aspects of the invention may also be embodied as computer-readable code in a computer-readable recording medium. The computer-readable recording medium may be any data storage device that can store data which can be thereafter read by a computer system. Examples of a computer-readable recording medium include read-only memory (ROM), random-access memory (RAM), CD-ROMs, magnetic tapes, floppy disks, optical data storage devices, and carrier waves (such as data transmission through the Internet). The computer-readable recording medium may also be distributed over network-coupled computer systems so that the computer-readable code is stored and executed in a distributed fashion. Also, functional programs, code, and code segments for accomplishing the present invention can be easily construed by programmers skilled in the art to which the present invention pertains.

Although several embodiments of the invention have been shown and described, it would be appreciated by those of ordinary skill in the art that changes may be made in these embodiments without departing from the principles and spirit of the invention, the scope of which is defined in the claims and their equivalents.

What is claimed is:

1. A non-transitory information storage medium, comprising:
   audio-visual (AV) data;
   metadata comprising information regarding the AV data, the metadata being stored in a local storage of a reproduction apparatus when the information storage medium is inserted into the reproduction apparatus, the metadata being used to form a disc library in the local storage, the disc library comprising a collection of metadata included in one or more information storage media; and
   application information configured to create a user interface that provides information included in the disc library,
   wherein:
   the reproduction apparatus is configured to determine if the local storage has an available area to store the metadata when the information storage medium is inserted into the reproduction apparatus; and
   the reproduction apparatus reserves the available area to store the metadata if the reproduction apparatus determines the local storage has the available area to store the metadata.

2. The medium of claim 1, wherein the metadata is available in the reproduction apparatus even after the information storage medium has been removed from the reproduction apparatus.

3. The medium of claim 1, wherein the application information comprises program data configured to determine whether the reproduction apparatus supports the disc library.

4. The medium of claim 3, wherein the program data comprises an access API function configured to extract information included in the disc library stored in the local storage.

5. The medium of claim 1, wherein the local storage is identified by a unique identifier of the reproduction apparatus.

6. A reproduction apparatus, comprising:
a local storage configured to store a disc library, the disc library comprising a collection of metadata included in one or more information storage media, the disc library being formed by using the metadata read from the information storage media before the information storage media is reproduced by the reproduction apparatus;
a navigation manager configured to read and execute an application, the application being configured to create a user interface, the user interface being configured to provide information included in the disc library stored in the local storage, from an information storage medium inserted in the reproduction apparatus, the information storage medium being one of the one or more information storage media; and
a renderer configured to output the user interface,
wherein:
the reproduction apparatus is configured to determine if the local storage has an available area to store the metadata of the information storage medium when the information storage medium is inserted in the reproduction apparatus; and
the reproduction apparatus reserves the available area to store the metadata if the reproduction apparatus determines the local storage has the available area to store the metadata.

7. The apparatus of claim 6, wherein the application is configured to read style information from the information storage medium inserted in the reproduction apparatus and create the user interface using the style information.

8. The apparatus of claim 6, further comprising:
a presentation engine configured to decode moving picture data stored in the information storage medium inserted in the reproduction apparatus;
wherein, if the presentation engine receives a request from the navigation manager requesting a determination as to whether the disc library is supported by the reproduction apparatus, the presentation engine sends system parameter information set in a system register of the presentation engine indicating whether the disc library is supported by the reproduction apparatus to the navigation manager.

9. The apparatus of claim 6, wherein the available area is identified by a unique identifier of the information storage medium.

10. A method of providing metadata, the method comprising:
storing a disc library in a local storage of a reproduction apparatus, the disc library including a collection of metadata included in one or more information storage media, the disc library being formed by using the metadata read from the information storage media before the information storage media are reproduced by the reproduction apparatus;
reading an application configured to create a user interface, the user interface being configured to provide information included in the disc library stored in the local storage, from an information storage medium inserted in the reproduction apparatus, the information storage medium being one of the one or more information storage media;
determining if the local storage has an available area to store the metadata of the information storage medium when the information storage medium is inserted in the reproduction apparatus;
reserving the available area to store the metadata if the local storage has the available area to store the metadata; and
outputting the user interface.

11. The method of claim 10, further comprising:
determining through the application whether the reproduction apparatus supports the disc library.

12. The method of claim 11, wherein the determining comprises reading information indicating whether the disc library is available, from a system register of the reproduction apparatus.

13. A non-transitory computer-readable medium encoded with processing instructions for implementing a method, performed by a computer, of providing metadata, the method comprising:
storing a disc library in a local storage of a reproduction apparatus, the disc library including a collection of metadata included in one or more information storage media, the disc library being formed by using the metadata read from the information storage media before the information storage media are reproduced by the reproduction apparatus;
reading an application configured to create a user interface, the user interface being configured to provide information included in the disc library stored in the local storage, from an information storage medium inserted in the reproduction apparatus, the information storage medium being one of the one or more information storage media:
determining if the local storage has an available area to store the metadata of the information storage medium when the information storage medium is inserted in the reproduction apparatus;
reserving the available area to store the metadata if the local storage has the available area to store the metadata; and
outputting the user interface.

14. The non-transitory computer-readable medium of claim 13, wherein the method further comprises:
determining through the application whether the reproduction apparatus supports the disc library.

15. The non-transitory computer-readable medium of claim 14, wherein the determining comprises reading information indicating whether the disc library is available, from a system register of the reproduction apparatus.

* * * * *